United States Patent
Watanabe (10) Patent No.: US 11,546,499 B2
(45) Date of Patent: Jan. 3, 2023

(54) IMAGE CAPTURING APPARATUS AND METHOD FOR CONTROLLING THE SAME, AND NON-TRANSITORY COMPUTER-READABLE STORAGE MEDIUM

(71) Applicant: CANON KABUSHIKI KAISHA, Tokyo (JP)

(72) Inventor: Tatsuya Watanabe, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/333,084

(22) Filed: May 28, 2021

(65) Prior Publication Data

US 2021/0392262 A1   Dec. 16, 2021

(30) Foreign Application Priority Data

Jun. 11, 2020 (JP) .............................. JP2020-101695

(51) Int. Cl.
*H04N 5/232* (2006.01)

(52) U.S. Cl.
CPC ............................... *H04N 5/23203* (2013.01)

(58) Field of Classification Search
None
See application file for complete search history.

(56) References Cited

U.S. PATENT DOCUMENTS

| | | | | |
|---|---|---|---|---|
| 7,047,352 | B1* | 5/2006 | Khu | G06F 30/34 711/170 |
| 2012/0147221 | A1* | 6/2012 | Hasegawa | H04N 5/765 348/E7.085 |
| 2012/0254796 | A1* | 10/2012 | Tan | H04N 1/00347 715/810 |

FOREIGN PATENT DOCUMENTS

| JP | 2007-279826 A | 10/2007 |
|---|---|---|
| JP | 2008-182327 A | 8/2008 |
| JP | 2017-111530 A | 6/2017 |

* cited by examiner

*Primary Examiner* — James M Hannett
(74) *Attorney, Agent, or Firm* — Cowan, Liebowitz & Latman, P.C.

(57) ABSTRACT

This invention provides an image capturing apparatus having an interface for connecting with a device including a programmable integrated circuit, and a storage unit for storing configuration data of the programmable integrated circuit, wherein the apparatus comprises an updating unit which updates the configuration data of the storage unit of the device via interface; and a determining unit which determines whether the updating is completed by the updating unit, wherein the updating unit writes, via the interface, the configuration data to the storage unit by issuing a updating request to the device and transferring the configuration data, and receives, via the interface, the configuration data by issuing a readout request to the device, wherein the determining unit determines whether the updating is completed by determining whether the received configuration data matches the written configuration data.

12 Claims, 8 Drawing Sheets

IMAGE CAPTURING APPARATUS AND METHOD FOR CONTROLLING THE SAME, AND NON-TRANSITORY COMPUTER-READABLE STORAGE MEDIUM

BACKGROUND OF THE INVENTION

Field of the Invention

The present invention relates to an image capturing apparatus and a method for controlling the image capturing apparatus, and a non-transitory computer-readable storage medium.

Description of the Related Art

In recent years, in various scenarios, using images captured by a monitoring camera, image analyses such as detection and tracking of objects, and estimation of attributes have been performed, and further image processing such as estimation of the number of objects based upon the results of such image analyses, has been performed. The image analyses have been performed by transferring images from the monitoring camera to a high-performance operation apparatus such as a PC or a server. However, with the improvement of the processing capability of the mobile operation apparatuses, the number of cases in which image analysis is performed directly on the camera side has also been increasing. As mounting forms, a form in which the operation apparatus is disposed in a camera body and a form in which the operation apparatus is stored in an attachable and detachable device having an interface such as Universal Serial Bus (USB) and connected to the camera are also proposed. By attaching the attachable and detachable device on which the operation apparatus is placed to the camera, more advanced analysis processing can be performed on the camera side.

In the above form, it is necessary to set the configuration data in which the circuit configuration and the setting information are described for the operation apparatus disposed in the attachable and detachable device by an I/F corresponding to the operation apparatus. However, when the attachable and detachable device is attached to the camera using a general-purpose I/F such as USB, this I/F is different from the I/F for setting the operation apparatus. Thus, a storage unit for storing the configuration data is provided on the attachable and detachable device so that the operation apparatus can be independently set and started. On the other hand, the configuration data stored in the storage unit needs to be rewritten from the camera via the operation apparatus when the application is changed or the operation apparatus is updated.

Therefore, when the data is lost due to unintended operation while rewriting the configuration data, the user cannot start the operation apparatus.

Japanese Patent Laid-Open No. 2017-111530 (hereinafter referred to as literature 1) proposes a method for rewriting the contents of a memory via a general-purpose interface. Further, Japanese Patent Laid-Open No. 2007-279826 (hereinafter referred to as literature 2) describes a method for backing up data stored before rewriting.

However, the conventional technology disclosed in literature 1 described above does not describe a restoration method when the rewriting cannot be performed correctly. Further, the conventional technology disclosed in literature 2 does not describe a method for confirming whether the transmission data is correctly written.

SUMMARY OF THE INVENTION

The present invention provides an image capturing apparatus that can correctly rewrite the configuration data stored in a storage unit installed in an attachable and detachable device, a method for controlling the image capturing apparatus, and a non-transitory computer-readable storage medium.

According to an aspect of the invention, there is provided an image capturing apparatus having an attachment mechanism being attachable/detachable to/from a device including an interface for attaching/detaching to/from the image capturing apparatus, a programmable integrated circuit, and a storage unit configured to store configuration data of the programmable integrated circuit, the image capturing apparatus comprising: an updating unit configured to update the configuration data of the storage unit of the device via the attachment mechanism; and a determining unit configured to determine whether the updating is completed by the updating unit, wherein the updating unit writes, via the attachment mechanism, the configuration data to the storage unit by issuing a request for updating the configuration data to the device and transferring the configuration data, and receives, via the attachment mechanism, the configuration data by issuing a readout request for the configuration data to the device, wherein the determining unit determines whether the updating by the updating unit is completed by determining whether the configuration data received from the device matches the written configuration data.

According to the present invention, the configuration data of the storage unit installed in the attachable and detachable device can be rewritten with high reliability.

Further features of the present invention will become apparent from the following description of exemplary embodiments (with reference to the attached drawings).

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

System Configuration

Figure 1:
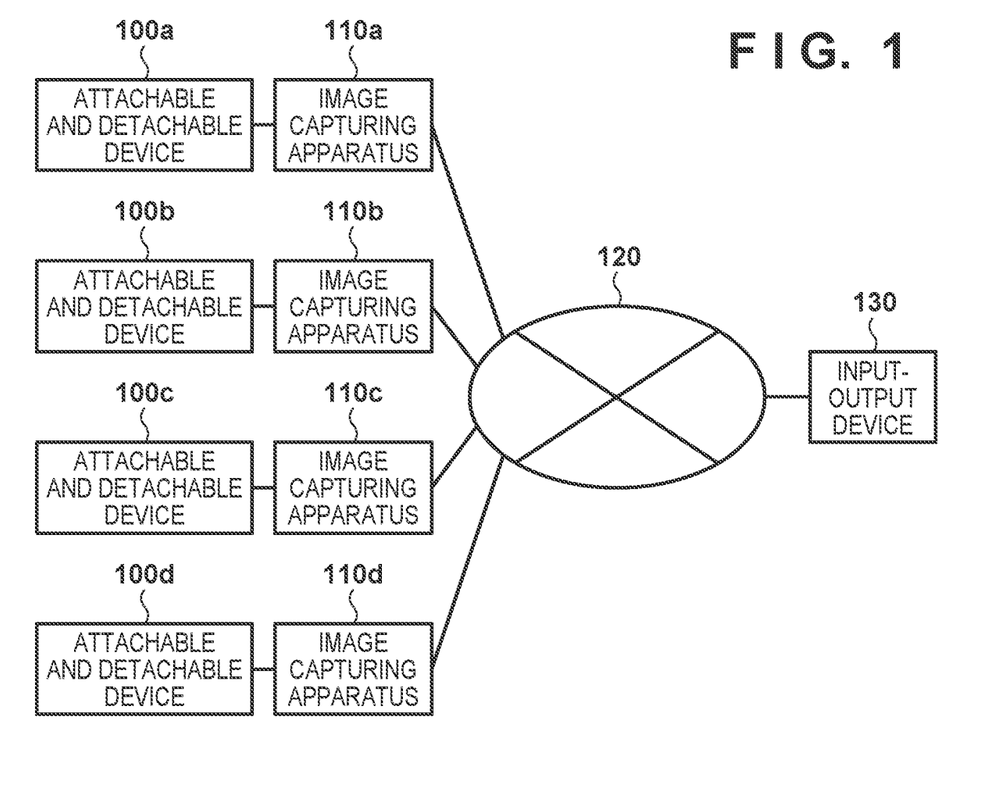
FIG. 1 is a diagram illustrating a system configuration.

FIG. 1 illustrates a configuration example of an image analysis system of the present embodiment. Hereinafter, as an example, a case in which the system is a specific person tracking system will be described. However, not limited thereto, the following discussion can be applied to any system that analyzes images and outputs predetermined information. This system includes image capturing apparatuses 110a to 110d, a network 120, and an input-output device 130. Note that each of the image capturing apparatuses 110a to 110d includes, for instance, a slot into which a device capable of recording a captured image can be attached and detached, and is connected to each of attachable and detachable devices 100a to 100d by inserting each of the attachable and detachable devices 100a to 100d into the slot. Further, the attachable and detachable devices 100a to 100d each have the same configuration, and any one of the attachable and detachable devices 100a to 100d is referred to as the "attachable and detachable device 100" without a suffix "a", "b", "c", or "d". Also, the image capturing apparatuses 110a to 110d each have the same configuration, and any one of the image capturing apparatuses 110a to 110d is referred to as the "image capturing apparatus 110" without a suffix.

The attachable and detachable device 100 is an operation device that is attachable to and detachable from the image capturing apparatus 110. As an example, the attachable and detachable device 100 is a device in which an SD card is equipped with a predetermined processing circuit. The attachable and detachable device 100 is configured so that the entire attachable and detachable device 100 can be inserted into the image capturing apparatus 110, for instance, in accordance with a form of the SD card, so that the attachable and detachable device 100 can be configured so as to be connectable to the image capturing apparatus 110 without a portion protruding from the image capturing apparatus 110. Consequently, it is possible to prevent the attachable and detachable device 100 from interfering with obstacles such as wiring, and it is possible to improve the convenience when utilizing the device. In addition, since an SD card slot is provided in the image capturing apparatus 110 such as a number of existing network cameras, an extended function can be provided by the attachable and detachable device 100 to the existing image capturing apparatus 110. Note that, in addition to the form of SD card, the attachable and detachable device 100 may be configured to be attached to the image capturing apparatus 110 by any interface used at least when a storage device capable of storing the image captured by the image capturing apparatus 110 is attached. For instance, the attachable and detachable device 100 may be configured to have a Universal Serial Bus (USB) interface and may be configured to be attached in the USB socket of the image capturing apparatus 110. Further, a predetermined processing circuit is implemented by, for instance, a field programmable gate array (FPGA) programmed to perform predetermined processing, but may be implemented by other programmable integrated circuits.

The image capturing apparatus 110 is an image capturing apparatus such as a network camera. In the present embodiment, the image capturing apparatus 110 includes, but is not limited to, an operation apparatus capable of processing an image. For instance, an external computer such as a personal computer (PC) connected to the image capturing apparatus 110 may be present, and a combination thereof may be treated as the image capturing apparatus 110. In addition, in the present embodiment, as illustrated in the drawing, each of the attachable and detachable devices 100 is attached to each of the image capturing apparatuses 110. Note that FIG. 1 illustrates four image capturing apparatuses 110 and attachable and detachable devices 100 attached to the respective image capturing apparatuses, but the number of combinations of these devices is not particularly limited, and may be three or less, or five or more. By attaching the attachable and detachable device 100 having an image analysis processing function to the image capturing apparatus 110, it is possible to perform the video processing on the image capturing apparatus 110 side even when the image capturing apparatus 110 does not have the image analysis processing function. Further, in the form in which the operation apparatus for video processing is disposed in the image capturing apparatus 110 as in the present embodiment, by attaching the attachable and detachable device 100 in which the operation apparatus is disposed to the image capturing apparatus 110, it is possible to diversify and upgrade the image processing that can be performed on the image capturing apparatus 110 side.

The input-output device 130 is a device that receives input from a user and outputs information to the user (for instance, displays information). In the present embodiment, for instance, the input-output device 130 is a computer such as a PC, and information is inputted and outputted by a browser or a native application installed in the computer.

The image capturing apparatus 110 and the input-output device 130 are communicatively connected via the network 120. The network 120 includes, for instance, a plurality of routers, switches, and cables that meet communication standards such as Ethernet (registered trademark). In the present embodiment, the network 120 may be any network that enables communication between the image capturing apparatus 110 and the input-output device 130, and may be established by any scale, configuration, and compliant communication standard. For instance, the network 120 may be the Internet, a wired local area network (LAN), a wireless LAN, a wide area network (WAN), or the like. The network 120 may be configured to enable communication using a communication protocol compliant with the Open Network Video Interface Forum (ONVIF) standard, for instance. However, the network 120 is not limited to this, and may be configured so as to be able to communicate with other communication protocols such as a unique communication protocol.

Configuration of Image Capturing Apparatus

Figure 2:
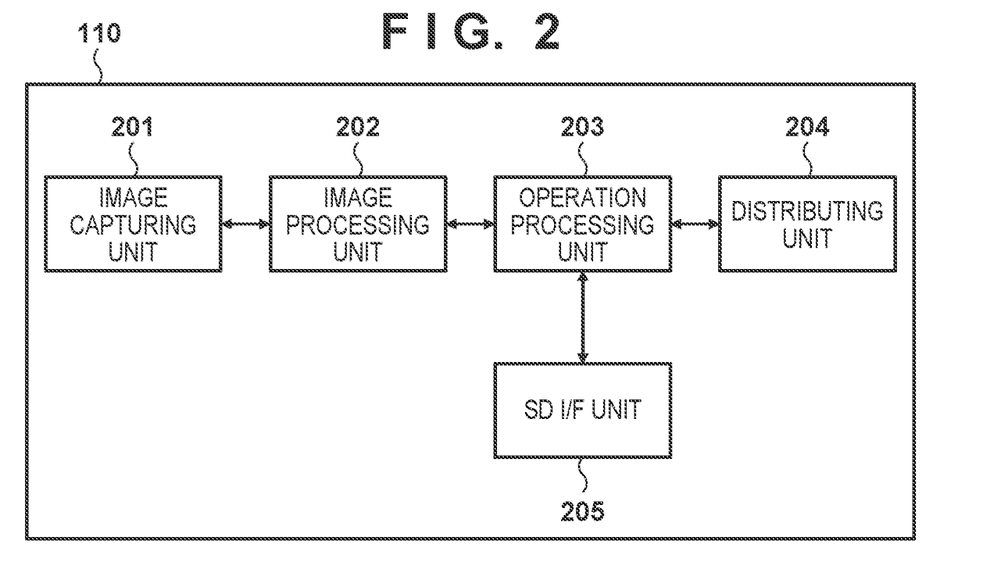
FIG. 2 is a hardware configuration diagram of an image capturing apparatus.

Next, a configuration of the image capturing apparatus 110 will be described. FIG. 2 is a diagram illustrating a hardware configuration example of the image capturing apparatus 110. The image capturing apparatus 110 includes, for instance, an image capturing unit 201, an image processing unit 202, an operation processing unit 203, a distributing unit 204, and an SD I/F unit 205. Note that I/F is an abbreviation for interface.

The image capturing unit 201 includes a lens unit for forming an image of light, and an image capturing element that converts the formed light into an analog signal. The lens unit has a zoom function for adjusting the angle of view, an aperture function for adjusting the amount of light, and the like. The image capturing element has a gain function that adjusts the sensitivity when converting the light into the analog signal. These functions are adjusted based upon the setting values notified from the image processing unit 202. The analog signal acquired by the image capturing element is converted into a digital signal by an analog to digital conversion circuit in the image capturing unit 201, and is transferred to the image processing unit 202 as an image signal (or image data).

The image processing unit 202 includes an image processing engine, peripheral devices thereof, and the like. The peripheral devices include, for instance, a random access memory (RAM) and drivers for the respective I/Fs. The image processing unit 202 generates image data by performing image processing such as development processing, filter processing, sensor correction, and noise removal on the image signal acquired from the image capturing unit 201. Further, the image processing unit 202 can perform exposure adjustment so that an appropriate exposure image can be acquired by transmitting the set values to the lens unit and the image capturing element. The image data generated in the image processing unit 202 is transferred to the operation processing unit 203.

The operation processing unit 203 is configured by one or more processors such as a CPU and an MPU, memories such as a RAM and a ROM, the drivers for the respective I/Fs, and the like. Note that CPU is an acronym for Central Processing Unit, MPU is for Micro Processing Unit, RAM is for Random Access Memory, and ROM is for Read Only Memory. In one example, the operation processing unit 203 may allocate the plurality of kinds of processing to be performed in the system described above to the image capturing apparatus 110 and the attachable and detachable device 100, and may perform the processing corresponding to the determined allocation. The contents and allocation of the kinds of processing will be described in detail later. The operation processing unit 203 transfers the image received from the image processing unit 202 to the distributing unit 204 or the SD I/F unit 205. The operation processing unit 203 also transfers the data of the processing result to the distributing unit 204.

The distributing unit 204 includes a network distribution engine and peripheral devices such as a RAM and an Ethernet PHY module. The Ethernet PHY module is a module that performs processing of a physical (PHY) layer of Ethernet. The distributing unit 204 converts the image data and the processing result data acquired from the operation processing unit 203 into a format capable of being distributed to the network 120, and outputs the converted data to the network 120.

The SD I/F unit 205 is an interface portion for connecting to the attachable and detachable device 100, and includes, for instance, a power supply and an attachment mechanism, such as an attachable and detachable socket, for attaching/detaching the attachable and detachable device 100. Here, the SD I/F unit 205 is configured in accordance with the SD standard developed by the SD Association. Communication between the attachable and detachable device 100 and the image capturing apparatus 110, such as transfer of the acquired image from the operation processing unit 203 to the attachable and detachable device 100, and the acquisition of data from the attachable and detachable device 100 is performed through the SD I/F unit 205.

Figure 3:
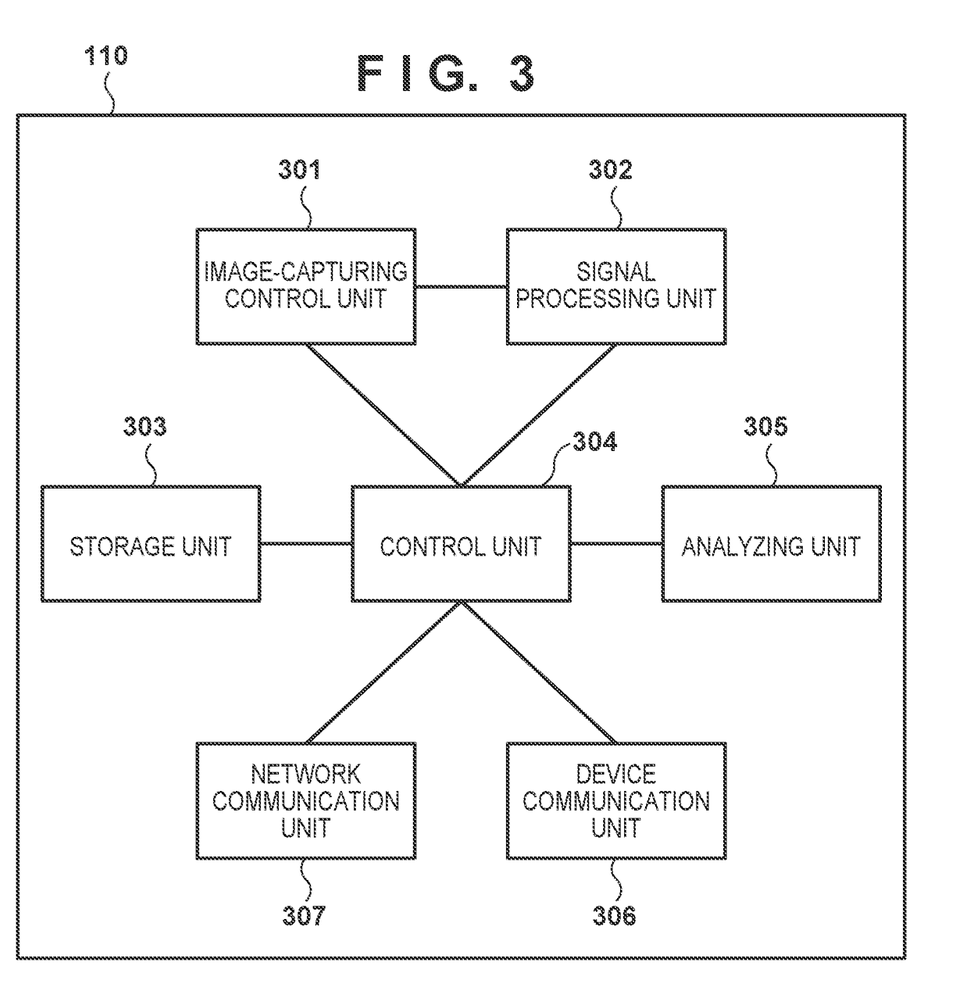
FIG. 3 is a functional configuration diagram of the image capturing apparatus.

FIG. 3 illustrates an example of a functional configuration of the image capturing apparatus 110. The image capturing apparatus 110 includes, for instance, an image-capturing control unit 301, a signal processing unit 302, a storage unit 303, a control unit 304, an analyzing unit 305, a device communication unit 306, and a network communication unit 307, as functions.

The image-capturing control unit 301 controls for photographing the surrounding environment via the image capturing unit 201. The signal processing unit 302 generates data of the captured image by performing predetermined processing on the image captured by the image-capturing control unit 301. Hereinafter, the data of the captured image is simply referred to as the "captured image". The signal processing unit 302 encodes, for instance, the image captured by the image-capturing control unit 301. The signal processing unit 302 encodes the still image using a coding scheme such as, for instance, the Joint Photographic Experts Group (JPEG). In addition, the signal processing unit 302 encodes the moving image using a coding scheme such as H.264/MPEG-4 AVC (hereinafter referred to as "H.264") or High Efficiency Video Coding (HEVC). Further, the signal processing unit 302 may encode an image using a coding scheme selected by a user from a plurality of preset coding schemes, for instance, via an operation unit not illustrated in the image capturing apparatus 110.

The storage unit 303 stores a list of kinds of analysis processing that can be performed by the analyzing unit 305 (hereinafter referred to as a "first processing list") and a list of kinds of post-processing for the result of the analysis processing. In addition, the storage unit 303 stores the result of the analysis processing described later. Note that in the present embodiment, the processing to be performed is the analysis processing, but any processing may be performed, and the storage unit 303 may store the first processing list and the post-processing list for the processing related to the processing to be performed. The control unit 304 controls the signal processing unit 302, the storage unit 303, the analyzing unit 305, the device communication unit 306, and the network communication unit 307 so that each of them performs predetermined processing.

The analyzing unit 305 selectively performs at least one of pre-analysis processing, analysis processing, and post-analysis processing described later, on the captured image. The pre-analysis processing is processing to be performed on the captured image before performing the analysis processing described later. In the pre-analysis processing of the present embodiment, as an example, processing for dividing the captured image to create divided images is performed. The analysis processing is processing of outputting information obtained by analyzing the inputted image. In the analysis processing of the present embodiment, as an example, at least one of human detection processing, face detection processing, and vehicle detection processing is performed by inputting the divided image obtained by the pre-analysis processing, and the processing of outputting the analysis processing result is performed. The analysis processing may be processing configured to output a position of an object in the divided image using a machine learning model trained so that the object included in the image can be detected, for instance, according to the technology of non-patent document 1. The post-analysis processing is processing to be performed after the analysis processing is performed. In the post-analysis processing of the present embodiment, as an example, based upon the analysis processing result for each of the divided images, processing of outputting the total value of the number of objects detected in each of the divided images as a processing result is performed. Note that the analysis processing may be processing of detecting an object in the image by performing pattern matching and outputting the position thereof.

The device communication unit 306 communicates with the attachable and detachable device 100. The device communication unit 306 converts the inputted data into a format that can be processed by the attachable and detachable device 100, and transmits the data obtained by the conversion to the attachable and detachable device 100. Further, the device communication unit 306 receives data from the attachable and detachable device 100, and converts the received data into a format that can be processed by the image capturing apparatus 110. In the present embodiment, the device communication unit 306 performs processing of converting a decimal between a floating point format and a fixed point format as conversion processing, but in addition to this, other kinds of processing may be performed by the device communication unit 306. Further, in the present embodiment, the device communication unit 306 communicates with the attachable and detachable device 100 by transmitting a predetermined command sequence within the range of the SD standard to the attachable and detachable device 100, and receiving a response from the attachable and detachable device 100. The network communication unit 307 communicates with the input-output device 130 via the network 120.

Although preferred embodiments of the present invention have been described above, the present invention is not limited to such embodiments, and various modifications and changes can be made within the scope of the gist.

Configuration of Attachable and Detachable Device

Figure 4A:
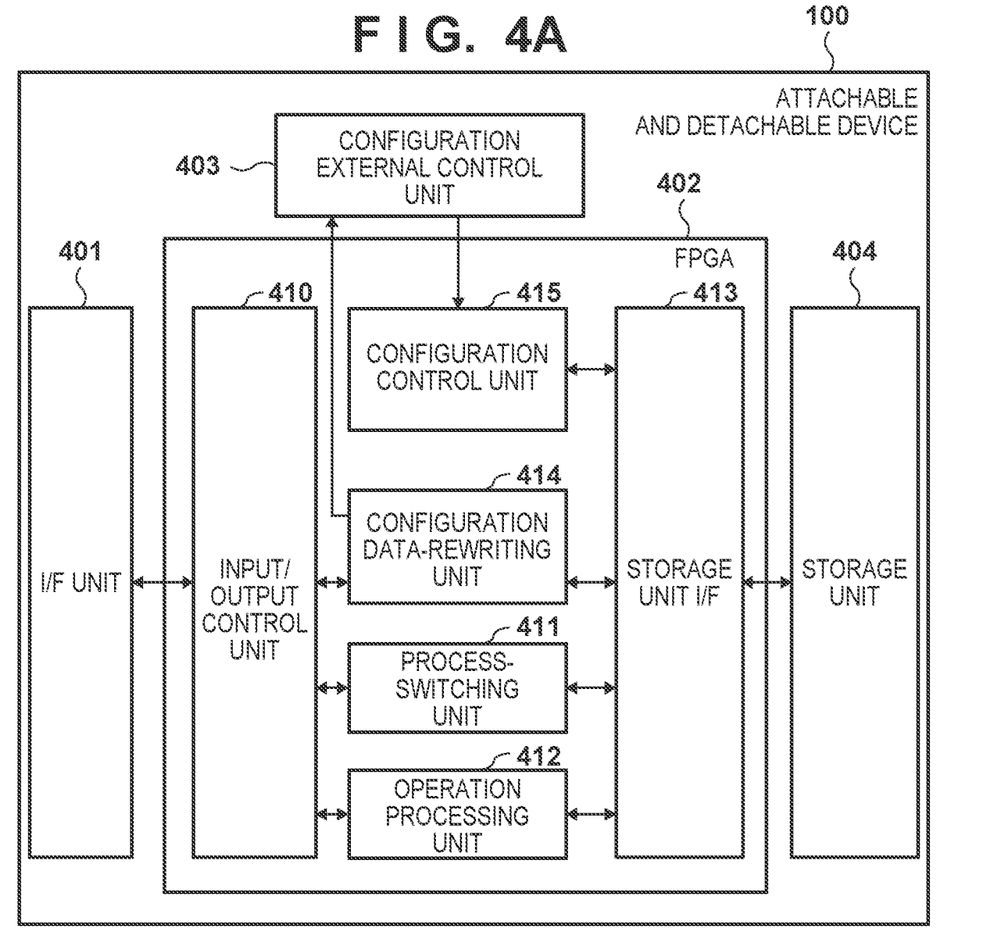
FIGS. 4A and 4B are hardware configuration diagrams of an attachable and detachable device.

Next, the configuration and operation of the attachable and detachable device 100 will be described. FIG. 4A is a hardware configuration diagram of the attachable and detachable device 100. As an example, the attachable and detachable device 100 includes an I/F unit 401, an FPGA 402, a configuration (hereinafter referred to as config) external control unit 403, and a storage unit 404. The I/F unit 401 included in the attachable and detachable device 100 is an interface having a shape that can be inserted into and extracted from the attachable and detachable socket of the SD I/F unit 205 included in the image capturing apparatus 110. That is, the I/F unit 401 is an interface having a shape conforming to the SD standard.

The I/F unit 401 includes, for instance, electrical contact terminal that receives power from the image capturing apparatus 110, and generates and distributes the power to be used in the attachable and detachable device 100. Similar to the SD I/F unit 205 of the image capturing apparatus 110, the I/F unit 401 conforms the items defined in (applicable to) the SD standard. The reception of images and setting data from the image capturing apparatus 110 and the transmission of data from the FPGA 402 to the image capturing apparatus 110 are performed via the I/F unit 401.

The FPGA 402 includes an input/output control unit 410, a process-switching unit 411, an operation processing unit 412, a storage unit I/F 413, a config data-rewriting unit 414, and a config control unit 415. The FPGA 402 is a type of semiconductor device capable of repeatedly reconfiguring an internal logic circuit structure. By the processing achieved by the FPGA 402, the attachable and detachable device 100 can add (provide) a processing function to the attached device. In addition, since the logic circuit structure can be changed later using the reconfiguration function of the FPGA 402, by attaching the attachable and detachable device 100 to a device in a field where the technological progress is rapid, it is possible to perform appropriate processing in a timely manner in the device. Note that in the present embodiment, an example in which the FPGA is used will be described, but as long as the processing described later can be achieved, for instance, a general purpose ASIC or a dedicated LSI may be used. The FPGA 402 is started by writing the setting data including the information on the logic circuit structure to be generated from a dedicated I/F or by reading out the setting data from the dedicated I/F. In the present embodiment, the setting data is stored in the storage unit 404. When the power is turned on, the FPGA 402 reads out the setting data from the storage unit 404 and generates the logic circuit and starts the operation. However, in addition to this, for instance, by mounting a dedicated circuit in the attachable and detachable device, the image capturing apparatus 110 may write the setting data to the FPGA 402 via the I/F unit 401.

The input/output control unit 410 includes a circuit for transmitting and receiving images to and from the image capturing apparatus 110, a circuit for analyzing commands received from the image capturing apparatus 110, a circuit for performing control based upon the analysis result, and the like. The commands here include commands defined in the SD standard as well as extended commands. The input/output control unit 410 can detect some of those commands. The details of the function will be described later. The input/output control unit 410 controls to transmit an image to the operation processing unit 412 in a case of image analysis processing, and to transmit configuration data (hereinafter, referred to as config data) to the storage unit I/F 413 in a case of the config rewriting processing. In a case that the input/output control unit 410 receives the setting data for switching processing, the input/output control unit 410 transmits the setting data to the process-switching unit 411.

The process-switching unit 411 includes a circuit for acquiring information on the image analysis processing function from the storage unit 404 and writing the information to the operation processing unit 412 based upon the setting data received from the image capturing apparatus 110. The pieces of information on the image analysis processing function are, for instance, setting parameters indicating the order and type of operation to be processed in the operation processing unit 412, the coefficient of the operation, and the like.

The operation processing unit 412 includes a plurality of operational circuits necessary for performing the image analysis processing function. The operation processing unit 412 performs the respective kinds of operation processing based upon the information on the image analysis processing function received from the process-switching unit 411. Then, the operation processing unit 412 transmits the result of the operation processing to the image capturing apparatus 110, and/or records the processing result in the storage unit 404.

In this manner, the FPGA 402 extracts the setting data of the processing function to be performed which is included in the setting data corresponding to the plurality of processing functions stored in advance, and rewrites the processing contents performed by the operation processing unit 412 based upon the extracted setting data. Consequently, the attachable and detachable device 100 can selectively perform at least any of the plurality of processing functions. Further, by adding the setting data of the processing to be newly added at any time, the latest processing can be performed on the image capturing apparatus 110 side. Note that, hereinafter, having a plurality of setting data corresponding to the respective plurality of processing functions is expressed as having a plurality of processing functions. In other words, even when the FPGA 402 of the attachable and detachable device 100 is configured to perform one processing function, in a case that the processing contents of the operation processing unit 412 can be changed by the setting data for other processing functions, it is expressed as having a plurality of processing functions.

The storage unit I/F 413 includes a circuit that converts the format of data received from the respective units configuring the FPGA 402 into a protocol suitable for the storage unit 404 to transmit and receive data. Here, the storage unit 404 is a NOR flash memory, and the storage unit L/F 413 corresponds to some of the commands corresponding to the standard for NOR flash memories, and the data is transmitted and received between the respective units configuring the FPGA 402 and the storage unit 404 via the storage unit I/F 413.

Figure 4B:
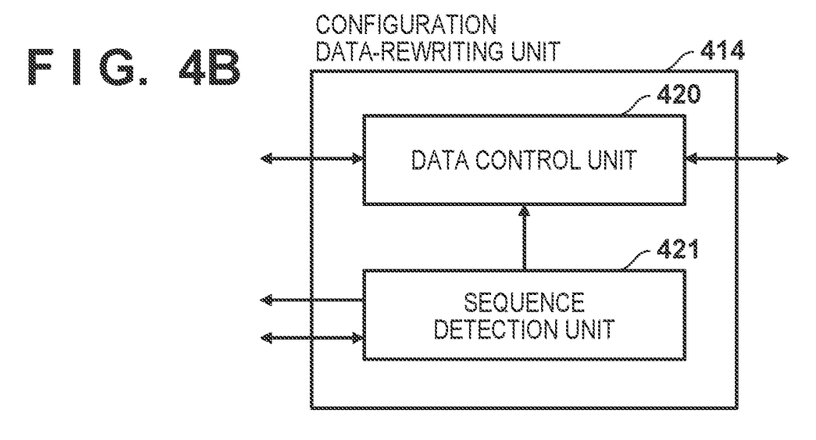

As illustrated in FIG. 4B, the config data-rewriting unit 414 includes a data control unit 420 and a sequence detection unit 421. The data control unit 420 receives the config data from the input/output control unit 410, and transmits the config data to the storage unit I/F 413 based upon the control signal received by the sequence detection unit 421. The sequence detection unit 421 receives commands related to the config among the SD-compliant commands detected by the input/output control unit 410. The sequence detection unit 421 stores the orders of received commands and detects whether the commands are received in the predetermined order, the commands are received within a certain period of time, and the like. The sequence detection unit 421 transmits a control signal to the data control unit 420 or the config external control unit 403 based upon the detected result.

The config control unit 415 includes a circuit that controls the config operation of the FPGA 402 based upon the control signal received from the config external control unit 403. In a typical FPGA, the circuit related to the config control is equipped not in a program logic (PL) portion designed by the FPGA designer but in the hardware circuit portion unique to the device. Although the above-mentioned portions are not described separately in FIG. 4A, the hardware circuit portion is used in the present embodiment. In other words, the storage unit I/F 413 is configured by a PL portion and a hardware circuit portion, and the config control unit 415 is configured by a hardware circuit portion.

The config external control unit 403 includes a circuit for inputting a control signal to be inputted to the config control unit 415 based upon the control signal received from the config data-rewriting unit 414. The control signal to be inputted to the config control unit 415 is, for instance, a signal for reconfiguring the FPGA, and when the FPGA 402 receives the control signal, the sequence for configuring the FPGA 402 is performed based upon the config data stored in a predetermined address of the storage unit 404.

The storage unit 404 is configured by, for instance, a NOR flash memory, and stores various kinds of information such as storage data written from the image capturing apparatus 110, information on the image analysis processing function to be written to the operation processing unit 412, and the config data of the FPGA 402.

Figure 5:
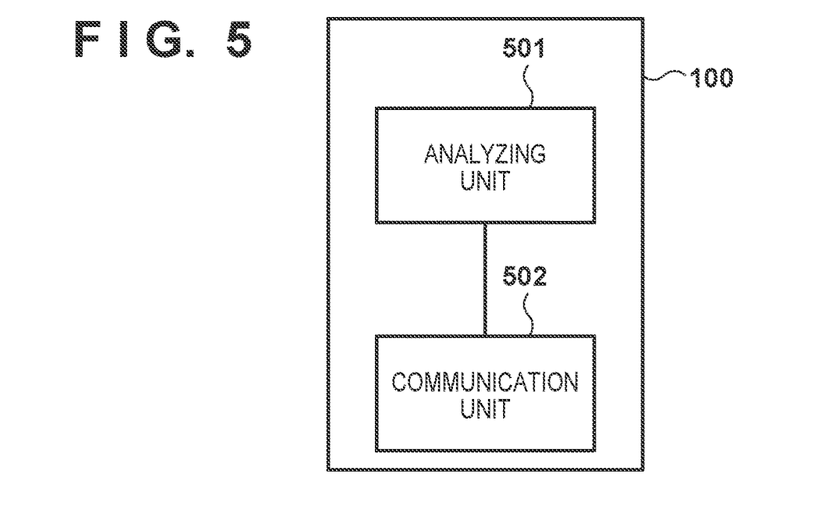
FIG. 5 is a functional configuration diagram of the attachable and detachable device.

FIG. 5 illustrates an example of a functional configuration of the attachable and detachable device 100. The attachable and detachable device 100 operates under power from the connected image capturing apparatus 110. The attachable and detachable device 100 includes, for instance, an analyzing unit 501 and a communication unit 502 as functional configurations of the attachable and detachable device 100. The analyzing unit 501 performs the analysis processing on the image. For instance, when the analysis processing setting request command is inputted from the image capturing apparatus 110, the analyzing unit 501 performs the setting for enabling the inputted analysis processing to be performed. Further, when an image is inputted, the analyzing unit 501 performs analysis processing set to a state that can be performed for the inputted image. In the present embodiment, the kinds of analysis processing that can be performed are, but not limited to, human body detection processing and face detection processing. For instance, the analysis processing may be processing for determining whether a person stored in advance is included in an image (face authentication processing described later). For instance, the degree of matching between the image feature amount of the person stored in advance and the image feature amount of the person detected from the inputted image is calculated, and when the degree of matching is equal to or greater than the threshold, it is determined that the person detected from the inputted image is the person stored in advance. Further, for the purpose of privacy protection, the analysis processing may be processing of superimposing a predetermined masked image or performing mosaic processing on the person detected from the inputted image. Furthermore, the analysis processing may be processing of detecting whether a person in the image performs a particular action using a learning model in which the particular action of the person is learned by machine learning. Moreover, the analysis processing may be processing of determining what kind of region the region in the image is. For instance, the analysis processing may be processing of determining what kind of region the region in the image is, by using a learning model in which buildings, roads, people, sky, and the like are learned by machine learning. As described above, the analysis processing that can be performed can be applied to both the image analysis processing using machine learning and the image analysis processing not using machine learning. Further, each of the kinds of analysis processing may not be performed by the attachable and detachable device 100 alone, but may be performed by the attachable and detachable device 100 in cooperation with the image capturing apparatus 110.

The communication unit 502 communicates with the image capturing apparatus 110 via the/F unit 401.

Configuration of Input-Output Device

Figure 10:
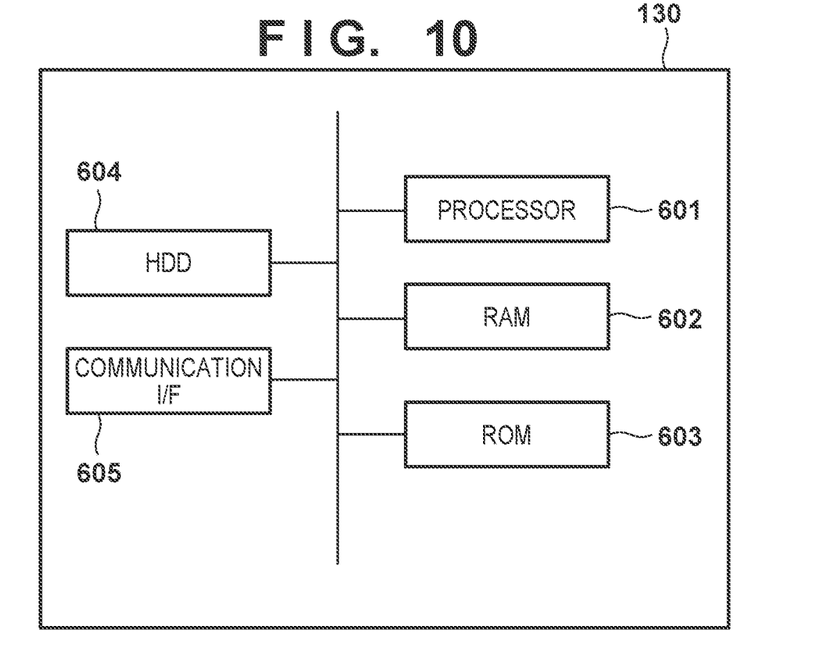
FIG. 10 is a hardware configuration diagram of an input-output device.

FIG. 10 illustrates an example of a hardware configuration of the input-output device 130. The input-output device 130 is configured as a computer such as a typical PC. For instance, as illustrated in FIG. 10, the input-output device 130 includes a processor 601 such as a CPU, memories such as a RAM 602 and a ROM 603, a storage device such as an HDD 604, and a communication I/F 605. The input-output device 130 can perform various functions by the processor 601 executing a program stored in the memory or the storage device.

Figure 11:
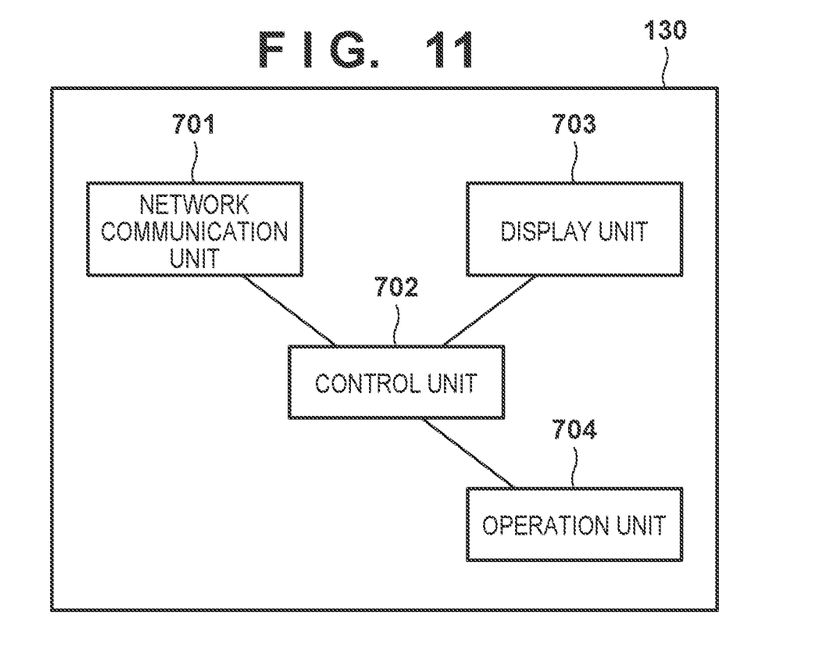
FIG. 11 is a functional configuration diagram of the input-output device.

FIG. 11 illustrates an example of a functional configuration of the input-output device 130 according to the present embodiment. The input-output device 130 includes, for instance, a network communication unit 701, a control unit 702, a display unit 703, and an operation unit 704 as functional configurations of the input-output device 130. The network communication unit 701 connects to, for instance, the network 120 and communicates with an external device such as the image capturing apparatus 110 via the network 120. Note that this is merely an example. For instance, the network communication unit 701 may be configured to establish a direct connection with the image capturing apparatus 110 and communicate with the image capturing apparatus 110 without passing through the network 120 or other devices. The control unit 702 controls the network communication unit 701, the display unit 703, and the operation unit 704 to perform the processing, by executing a program of the ROM 603 or a program loaded into the RAM 602. The display unit 703 displays information to the user via, for instance, a display. In the present embodiment, information is presented to the user by displaying the result rendered by the browser on the display. Note that information may be presented in a manner other than the screen display such as voice or vibration. The operation unit 704 receives user operation. In the present embodiment, the operation unit 704 includes a mouse and a keyboard, and the user operates these to input the operation to the browser. However, not limited to these, the operation unit 704 may include any other devices capable of detecting the intention of the user, such as a touch panel and a microphone.

Steps of Processing

Next, an example of steps of processing performed in the system will be described. Note that, of the following kinds of processing, the kinds of processing performed by the image capturing apparatus 110 are achieved, for instance, by a processor in the operation processing unit 203 executing a program stored in a memory or the like. However, this is only an example, and a part or all of the kinds of processing described later may be achieved by dedicated hardware. In addition, the kinds of processing performed by the attachable and detachable device 100 and the input-output device 130 may also be achieved by the processor in each device executing a program stored in a memory or the like, or a part or all of the kinds of processing may be achieved by dedicated hardware.

Overall Steps

Figure 6:
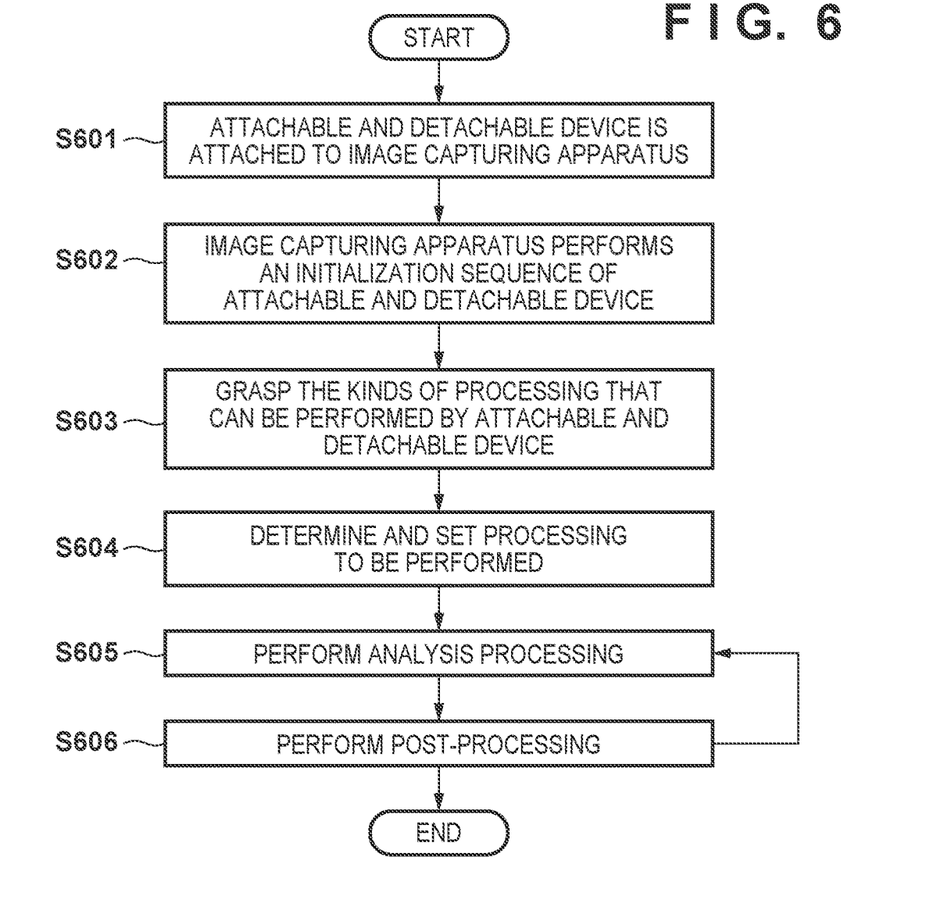
FIG. 6 is a diagram illustrating an example of steps of processing performed in a system.

FIG. 6 schematically illustrates a series of steps of image analysis processing performed in the system. In the series of steps of processing, first, the user attaches the attachable and detachable device 100 to the image capturing apparatus 110 (S601). The image capturing apparatus 110 performs an initialization sequence of the attachable and detachable device 100 (S602). In the initialization sequence, the predetermined commands are transmitted and received between the image capturing apparatus 110 and the attachable and detachable device 100, so that the image capturing apparatus 110 is ready to use the attachable and detachable device 100. Thereafter, the image capturing apparatus 110 grasps the kinds of processing that can be performed by the attachable and detachable device 100, and grasps the kinds of processing that can be performed locally (that can be performed by the image capturing apparatus 110 alone or a combination of the image capturing apparatus 110 and the attachable and detachable device 100) (S603). Note that the attachable and detachable device 100 can be configured to be capable of performing any kinds of processing, but the kinds of processing unrelated to the processing to be performed on the image capturing apparatus 110 side may not be considered. In one example, the image capturing apparatus 110 may hold, for instance, a list of the kinds of processing that can be performed acquired from the input-output device 130 in advance. In this case, by requesting information indicating the kinds of processing that can be performed by the attachable and detachable device 100, the image capturing apparatus 110 can grasp only the kinds of processing that can be performed depending on whether the kinds of processing in the information acquired from the attachable and detachable device 100 are included in the list. Subsequently, the image capturing apparatus 110 determines the processing to be performed, and performs the setting of the attachable and detachable device 100 as necessary (S604). In other words, when at least a part of the kinds of processing determined to be performed is performed by the attachable and detachable device 100, the setting of the attachable and detachable device 100 for the processing is performed. In this setting, for instance, the FPGA 402 can be reconfigured using the setting data corresponding to the processing to be performed. Then, the image capturing apparatus 110 or the attachable and detachable device 100 performs the analysis processing (S605). Thereafter, the image capturing apparatus 110 performs the post-processing (S606). Note that the processes of S605 and S606 are repeatedly performed. The series of processing steps in FIG. 6 is performed, for instance, when the attachable and detachable device 100 is attached, but even when the attachable and detachable device 100 is removed, at least a part of the processes in FIG. 6 may be repeatedly performed, for instance, the process of S603 may be performed again.

Config Data Rewriting Sequence of Attachable and Detachable Device

Figure 7:
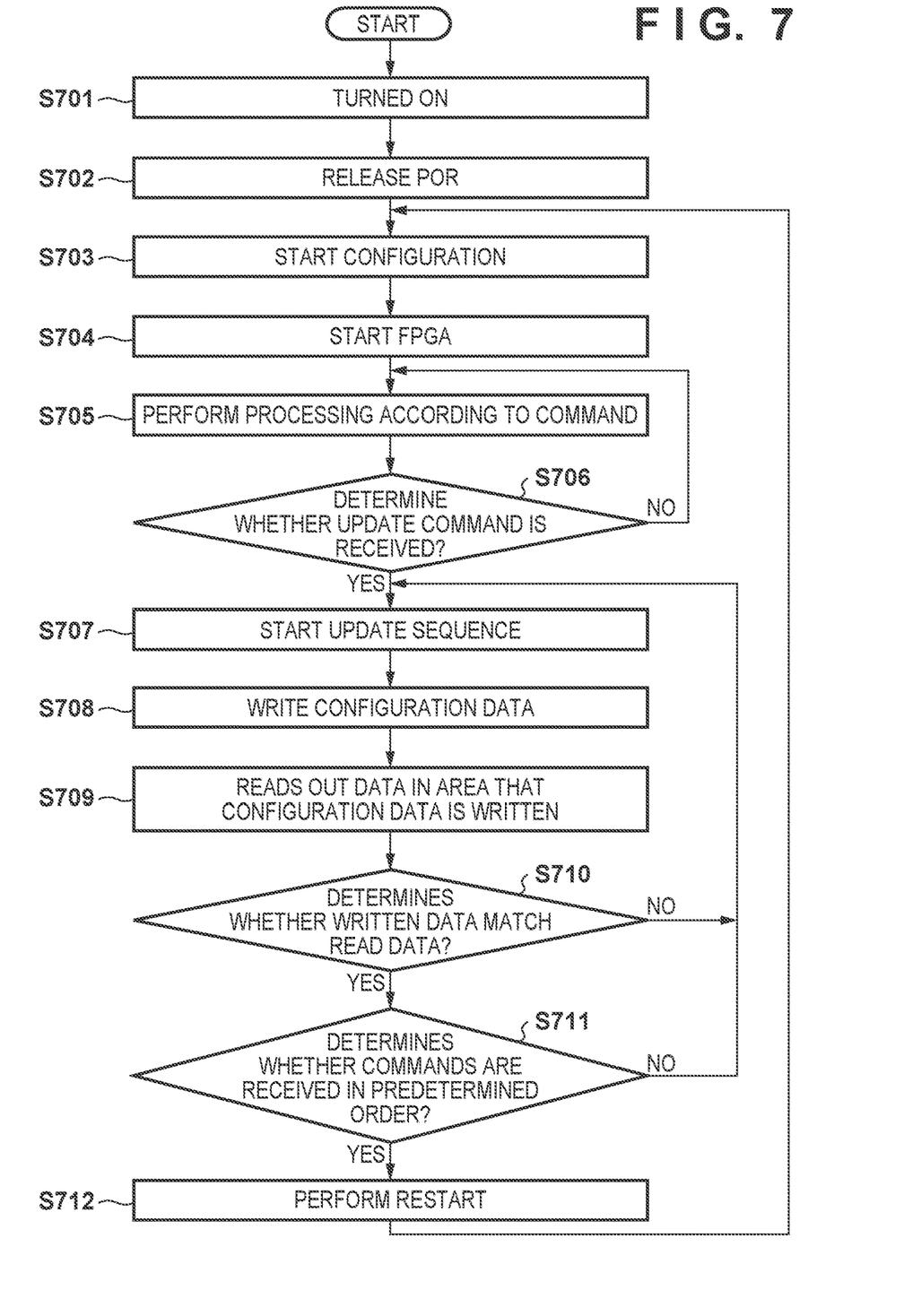
FIG. 7 is a diagram illustrating an example of a configuration data rewriting sequence of the attachable and detachable device.

FIG. 7 schematically illustrates a series of steps of the config data rewriting sequence to be performed by the attachable and detachable device 100. In the series of processing steps, first, the user attaches the attachable and detachable device 100 to the image capturing apparatus 110, and then the power of the image capturing apparatus 110 is turned on (S701). As a result, by the power of the attachable and detachable device 100 being turned on, the power of each of the FPGA 402 and the storage unit 404 is also turned on.

In accordance with the device selected by the FPGA 402, when the power supply voltage exceeds a certain value, a power on reset (POR) is internally released in the FPGA 402 (S702). When the POR is released in the FPGA 402, the config control unit 415 and the storage unit I/F 413 start operating. The config control unit 415 accesses the storage unit 404 via the storage unit I/F 413, reads out the config data, and configures the FPGA 402 (S703). The FPGA 402 is started based upon the config data after the configuration is completed (S704). The image capturing apparatus 110 and the FPGA 402 perform image analysis processing and the like while communicating with commands conforming to the SD standard (S705). The image capturing apparatus 110 determines whether the update command of the FPGA 402 is received from the user via the operation unit (not illustrated) (S706). When it is determined that the update command is received, the image capturing apparatus 110 transmits the update command to the FPGA 402 via the SD I/F unit 205. When the command received from the image capturing apparatus 110 is the update command, the FPGA 402 performs an update sequence in S706 and later. On the other hand, when the image capturing apparatus 110 determines that the update command is not received, the process is returned to S705 in order to continue performing the processing corresponding to reception of the other command.

When the FPGA 402 shifts to the update sequence, the input/output control unit 410 sets to output the data inputted from the image capturing apparatus 110 via the I/F unit 401 to the config data-rewriting unit 414. The sequence detection unit 421 starts confirmation whether the order of commands received after shifting to the update sequence satisfies the predefined order for the config data. Note that the predetermined order is determined according to the size of the config data or the device used in the storage unit 404. In addition, after shifting to the update sequence, the config data-rewriting unit 414 is controlled so that a reload signal is not outputted to the config external control unit 403 until the config data is correctly rewritten (S707). The image capturing apparatus 110 transmits the config data to the FPGA 402.

The FPGA 402 writes the config data received from the image capturing apparatus 110 to the storage unit 404 via the config data-rewriting unit 414 based upon the command. Note that, the address at the time of writing matches the area accessed at the time of configuring the FPGA 402 (S708). After the writing of the config data is completed, the image capturing apparatus 110 transmits a command to read out the data of the address of the storage unit 404 to the FPGA 402. Based upon the command received from the image capturing apparatus 110, the FPGA 402 reads out the data written in the address of the storage unit 404, and transmits the data to the image capturing apparatus 110 (S709). The image capturing apparatus 110 compares the written config data with the readout data, and determines whether the both data match. When the both data match, the image capturing apparatus 110 determines that the data is written correctly. On the other hand, when the both data do not match, the image capturing apparatus 110 determines that the writing is not correct, and performs the update sequence again (S710). The FPGA 402 determines whether the commands received after S707 satisfy the predetermined order, and when satisfy, proceeds to restart, and when not satisfy, sends a notification to the image capturing apparatus 110 to perform the update sequence again (S711). When the restart is performed, the config data-rewriting unit 414 outputs a reload signal to the config external control unit 403, and the FPGA 402 starts the configuration again (S712).

The above is a basic config data rewriting sequence of the attachable and detachable device in the present embodiment.

Figure 8A:
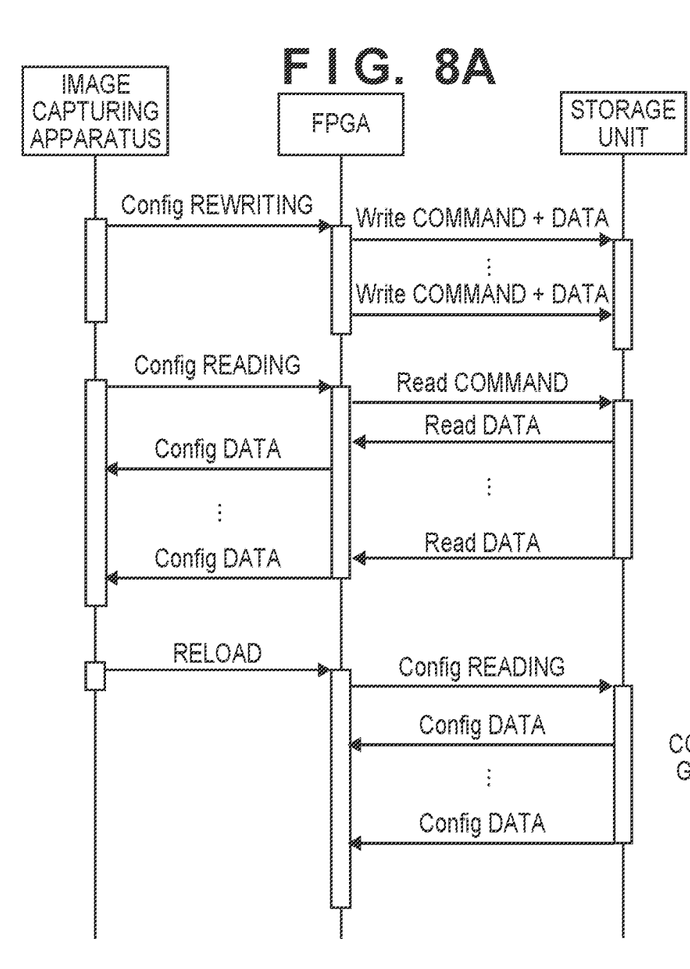
FIGS. 8A and 8B are diagrams illustrating communication sequences between the image capturing apparatus, an FPGA, and a storage unit.
Figure 8B:
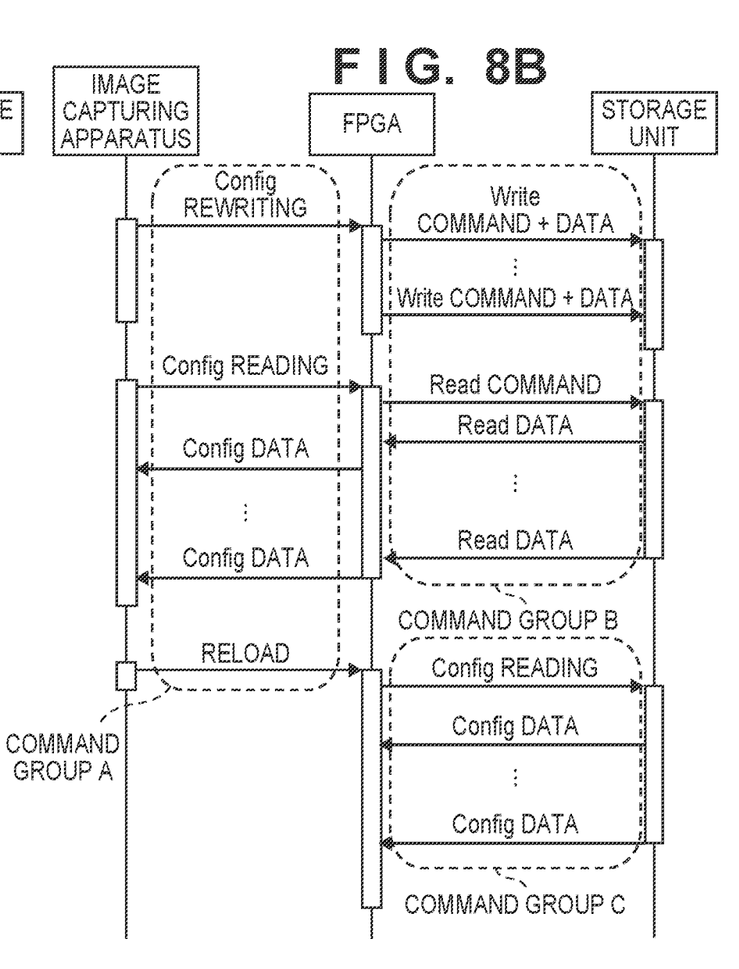

Details of Reading and Writing Part of Config Data Rewriting Sequence FIGS. 8A and 8B illustrate a series of steps of the config data rewriting sequence related to reading and writing config data performed between the image capturing apparatus 110, the FPGA 402 (of the attachable and detachable device 100), and the storage unit 404 on a command basis.

In the sequence diagram illustrated in FIG. 8A, the vertical axis is the elapsed time axis and the downward direction indicates the passage of time. In addition, the square indicates the period during which processing is being performed, and the arrow indicates the issuance of a command. Note that the image capturing apparatus 110 cannot directly communicate with the storage unit 404. The image capturing apparatus 110 issues a write command and starts transmitting the config data to the FPGA 402. At this time, the image capturing apparatus 110 transmits information including the amount of data to the FPGA 402, specifically, information regarding the number of blocks of data to the FPGA 402. Next, the FPGA 402 transmits the write command including the address information designating a write space and the data as a set to the storage unit 404. After writing, the image capturing apparatus 110 issues a read command and starts receiving data from the FPGA 402. At this time, the image capturing apparatus 110 transmits information on the read start address of the storage unit 404 to the FPGA 402. Next, the FPGA 402 transmits a read command including the read start address information to the storage unit 404. When the storage unit 404 receives the read command, the storage unit 404 sequentially transmits data to the FPGA 402 from the read start address until an end signal of data transfer is received from the FPGA 402. When the data received from the storage unit 404 exceeds a predetermined size, the FPGA 402 transmits the data to the image capturing apparatus 110. These two kinds of operation are repeated for the config data size, then the FPGA 402 transmits an end signal of the data transfer to the storage unit 404. Thereafter, the image capturing apparatus 110 issues a reload command and restarts the FPGA 402. When the FPGA 402 receives the reload command from the image capturing apparatus 110, the FPGA 402 reads out the config data from the address determined for each of the devices to the storage unit 404, and performs restart. A plurality of commands are used in FIG. 8A because each of commands has a different protocol. FIG. 8B illustrates a diagram in which the command types are added.

As illustrated in FIG. 8B, in the present embodiment, there are three types of command groups A. B, and C. The command group A is a protocol conforming to the SD standard. The command group B is a protocol conforming to the specifications of the storage unit 404, and is selected according to the device used for the storage unit 404. The command group C is a protocol conforming to the config specifications of the FPGA 402, and is a function embedded as hardware in a device used in FPGA 402. For the command groups A and B, the program designer of the FPGA 402 determines the circuit configuration so as to satisfy the respective protocols.

Variation of Success/Failure Determination of Config Data Writing

In the example described in "config data rewriting sequence of the attachable and detachable device", as one of the methods determining whether the config data is written correctly, the method uses whether the received commands satisfy the predetermined order as a criterion is explained.

For instance, it is conceivable that a method uses whether an update sequence is completed within a certain period of time as another criterion. In such a case, the image capturing apparatus 110 adds the process to start the time measurement after issuing the update sequence command (S707), and the process to complete the time measurement after reading out the data from the storage unit 404 and compare the time measured to the certain period of time (S710). As a method of determining the period required for the update sequence, there is a method to calculate from the data transfer time of the image capturing apparatus 110 and the FPGA 402, the data transfer time from the FPGA 402 to the storage unit 404, the time required for protocol conversion, or the like. Further, a plurality of criteria may be provided, and the two criteria described above may be used in combination.

Countermeasures when Config Data Writing Failed

In the config data rewriting sequence described so far, read/write data are compared, and when there is a mismatch, the update sequence is again performed (S710).

As another processing method, a method of saving the data originally recorded in the storage unit 404 and writing back the data under the above-described condition is also conceivable. The config data rewriting sequence in this case is illustrated in FIG. 9, and the difference from the config data rewriting sequence illustrated in FIG. 7 will be described.

Figure 9:
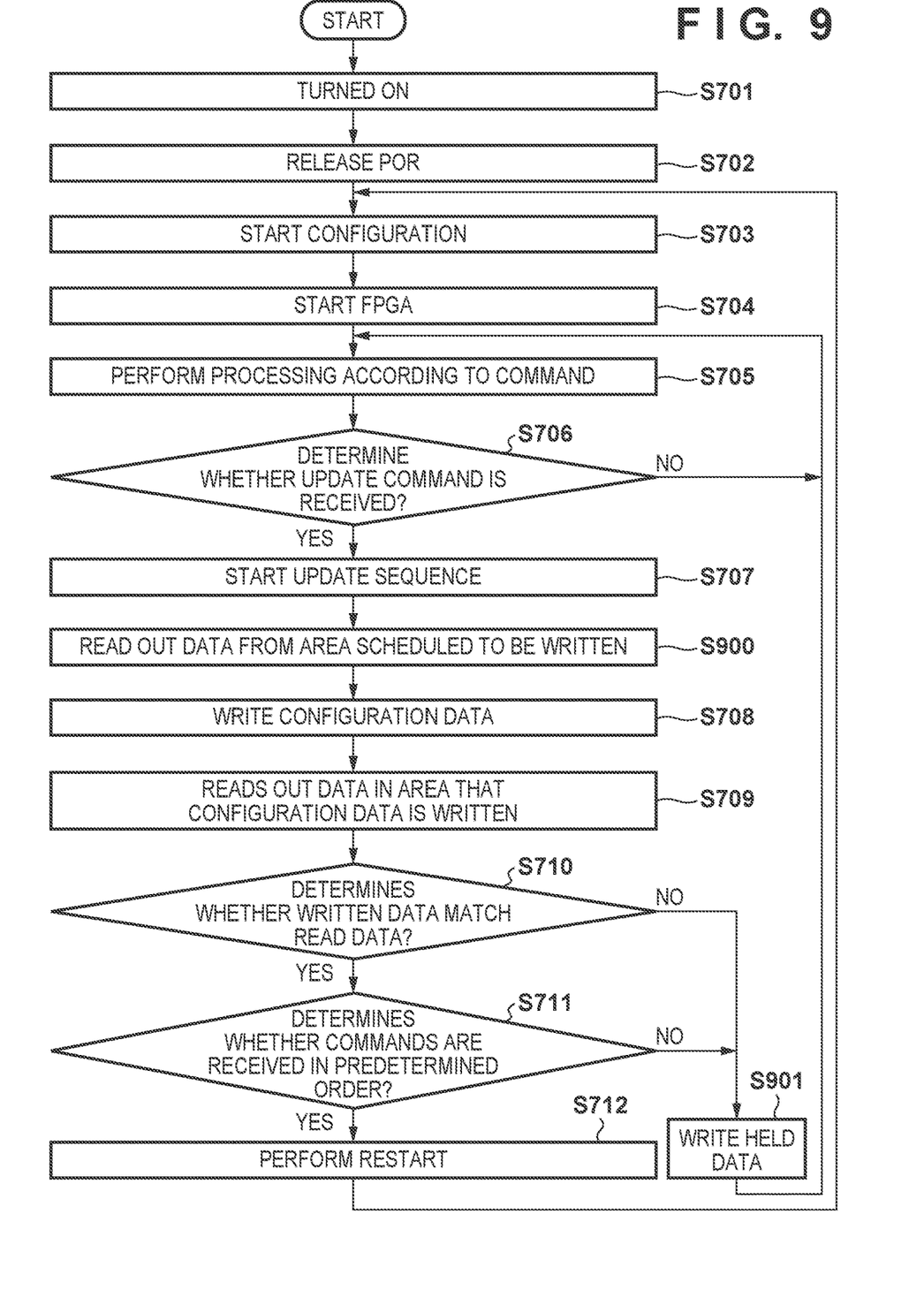
FIG. 9 is a diagram illustrating another example of the configuration data rewriting sequence of the attachable and detachable device.

When shifting to the config data rewriting sequence of FIG. 9, the image capturing apparatus 110 first reads out data from the area scheduled to be written in the storage unit 404 and holds the data in the storage unit 303 (S900) prior to starting the update sequence. Then, when the image capturing apparatus 110 determines that the config data rewriting is failed due to a mismatch of the read/write data, the image capturing apparatus 110 writes the held data (S901), and returns the process back to S705 in order to return to the normal operation.

Note that in the example described above, the readout data is stored in the storage unit 303 (RAM or non-volatile memory in the operation processing unit 203) of the image capturing apparatus 110, but the attachable and detachable device 100 or the FPGA 402 having a sufficient storage area may be used. In this case, the image capturing apparatus 110, to the FPGA 402, sets the movement destination address of the data in the area to be rewritten in the storage unit 404, issues a move (copy) command for moving the data to the movement destination address, and saves the data there. Then, after saving the data, the image capturing apparatus 110 rewrites the config data. Then, when it is determined that the rewriting of the config data is failed, the saved data is moved to the original area (S901), and the process returns to S705 in order to return to the normal operation.

In either case, in the FPGA 402, it is necessary to add a circuit configuration to read/write data from the area to be rewritten in accordance with the respective communication protocols.

Further, in the embodiment described above, the attachable and detachable device 100 is described as a device in which a predetermined processing circuit is equipped with an SD card, and as being connected to the SD I/F unit of the image capturing apparatus 110. However, the interface between the image capturing apparatus 110 and the attachable and detachable device 100 is not limited thereto, and may be, for instance, a USB interface.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-101695, filed Jun. 11, 2020, which is hereby incorporated by reference herein in its entirety.

What is claimed is:

1. An image capturing apparatus including a mounting part capable of being attachable/detachable to a device which includes a programmable integrated circuit and a storage unit configured to store configuration data of the programmable integrated circuit, the image capturing apparatus comprising:
    a communication unit configured to transfer a first data to the device by issuing a request for updating the configuration data to the first data, and receive a second data from the device by issuing a readout request for the configuration data stored in the storage unit, wherein the first data includes new setting information for the programmable integrated circuit; and
    a determining unit determines whether the configuration data has been updated completely by determining whether the second data received from the device matches the first data.

2. The image capturing apparatus according to claim 1, further comprising a restarting unit configured to restart the device in accordance with the configuration data when the configuration data has been updated completely.

3. The image capturing apparatus according to claim 1, wherein when the second data received from the device matches the first data,
    the communication unit transfers a reload command to the device.

4. The image capturing apparatus according to claim 1, wherein
    when the second data received from the device does not match the first data,
    the communication unit performs an update sequence again.

5. The image capturing apparatus according to claim 1, wherein
    the determining unit determines whether the configuration data has been updated completely based upon a time from issuance of an update sequence command by the image capturing apparatus to an end of writing the first data to the storage unit.

6. The image capturing apparatus according to claim 1, further comprising a saving unit configured to save the configuration data stored in a predetermined area of the device, wherein
    the communication unit writes the saved configuration data to the device when the second data received from the device does not match the first data.

7. The image capturing apparatus according to claim 1, wherein the programmable integrated circuit is a field programmable gate array (FPGA).

8. The image capturing apparatus according to claim 1, wherein
    the mounting part includes an SD card slot, and
    the device is a device in a form of an SD card.

9. A method that is executed by an image capturing apparatus, the method comprising:
    transferring a first data to a device by issuing a request for updating a configuration data to the first data, wherein the device including a programmable integrated circuit and a storage unit configured to store the configuration data of the programmable integrated circuit, wherein the first data includes new setting information for the programmable integrated circuit;
    receiving a second data from the device by issuing a readout request for the configuration data stored in the storage unit; and determining whether the configuration data has been updated completely by determining whether the second data received from the device matches the first data.

10. A non-transitory computer-readable storage medium storing a program which, when read and executed by a processor in an image capturing apparatus,, caused the processor to execute steps of a method of controlling the image capturing apparatus, the method comprising:

transferring a first data to a device by issuing a request for updating a configuration data to the first data, wherein the device including a programmable integrated circuit and a storage unit configured to store the configuration data of the programmable integrated circuit, wherein the first data includes new setting information for the programmable integrated circuit receiving a second data from the device by issuing a readout request for the configuration data stored in the storage unit; and determining whether the configuration data has been updated completely by determining whether the second data received from the device matches the first data.

11. A device including an interface for attaching/detaching to/from an image capturing apparatus, a programmable integrated circuit and a storage unit configured to store configuration data of the programmable integrated circuit, the device comprising:

an obtaining unit configured to obtain a first data and an update command from the image capturing apparatus, and a controlling unit configured to start an update sequence when the update command is received, wherein the controlling unit determines whether the commands received from the image capturing apparatus satisfy a predetermined order, wherein the controlling unit controls to transfer a second data written in a predetermined area of the storage unit to the image capturing apparatus in a case that it is determined that commands from the image capturing apparatus satisfies the predetermined order, wherein the controlling unit controls to output a notification to the image capturing apparatus to perform the update sequence again in a case that it is determined that the commands from the image capturing apparatus does not satisfy the predetermined order.

12. A method that is executed by device including an interface for attaching/detaching to/from an image capturing apparatus, a programmable integrated circuit, and a storage unit configured to store configuration data of the programmable integrated circuit, the method comprising:

obtaining a first data and an update command from the image capturing apparatus, controlling to start an update sequence when the update command is received, and determining the commends received from the image capturing apparatus satisfy a predetermined order, wherein a second data written in a predetermined area of the storage unit is transferred to the image capturing apparatus in a case that it is determined that the commands from the image capturing apparatus satisfy the predetermined order, and a notification is output to the image capturing apparatus to perform the update sequence again in a case that it is determined that the commands from the image capturing apparatus do not satisfy the predetermined order.

* * * * *